United States Patent Office 3,055,927
Patented Sept. 25, 1962

3,055,927
PREPARATION OF ORGANIC ORTHOSILICATES FROM SILICON TETRAFLUORIDE
John Maclelland Pollock, Northwich, England, assignor to Imperial Chemical Industries Limited, London, England, a corporation of Great Britain
No Drawing. Filed Sept. 7, 1960, Ser. No. 54,353
Claims priority, application Great Britain Sept. 21, 1959
4 Claims. (Cl. 260—448.8)

This invention relates to a new method of making organic orthosilicates.

In co-pending U.S. application Serial No. 9,684, filed February 19, 1960, we have described a process for making organic orthosilicates in which silicon tetrafluoride is reacted with an alcohol in the presence of a metallic sulphide. This method was regarded as an improvement over the known method in which silicon tetrachloride is reacted with an alcohol in that silicon tetrafluoride is more conveniently and cheaply made than silicon tetrachloride. The method was also regarded as an advance in the art in that silicon tetrafluoride is not known to react directly with alcohols.

We have now discovered several other compounds which when present in the reaction mixture enable silicon tetrafluoride to react with alcohols, and it would seem that metallic sulphides and these other compounds have two properties in common which are necessary for them to bring about the reaction, namely the electropositive half of the molecule forms a stable fluoride and the electronegative half forms with hydrogen a volatile compound. These compounds are thus believed to be particular examples of a general reaction which is the subject of the present invention.

According to our invention we provide a process for making organic orthosilicates comprising reacting under substantially moisture-free conditions silicon tetrafluoride with an alcohol in the presence of a compound of formula MA, wherein M is a metal able to combine with the fluorine of the silicon tetrafluoride to give a stable fluoride, and A is an element or group of elements able to combine with the hydroxyl hydrogen of the alcohol to form a volatile compound.

Compounds having the general formula MA as defined above include sulphides, chlorides, carbonates, carbides, oxides, cyanates of metals. Examples of such compounds are sodium chloride, calcium chloride; calcium carbide; sodium carbonate; calcium oxide; sodium cyanate; sodium sulphide, calcium sulphide.

The volatile compound AH should preferably not subsequently react with the alcohol or with silicon tetrafluoride, for if it does the yield of orthosilicate may be reduced. For example, when MA is sodium cyanate the volatile HCNO first formed can then react with the alcohol to give the corresponding carbamate in substantial yield.

The general reaction may be represented by the equation $$SiF_4 + 4ROH + 4MA \rightarrow Si(OR)_4 + 4MF + 4AH\uparrow$$

and the fluoride formed may react with additional silicon tetrafluoride to give a fluosilicate according to the equation $$2MF + SiF_4 \rightarrow M_2SiF_6$$

Alcohols able to take part in the reaction include primary, secondary and unsaturated aliphatic alcohols, for example n-butanol, cyclohexanol and allyl alcohol, respectively, and also aromatic alcohols wherein the hydroxyl group is in the side chain, for example benzyl alcohol.

A convenient method of carrying out the reaction is to prepare a solution of silicon tetrafluoride in the chosen alcohol, and to add this gradually with stirring to a heated refluxing mixture of the alcohol and the metal compound and, if desired, an inert solvent for example xylene. The reactants should be free from moisture, and ingress of moisture into the reaction environment should be prevented. After the addition has been made the reaction mixture may, if desired, be refluxed further and after this the liquid phase is separated from the solid residue of fluoride or fluosilicate by filtration and distilled.

The invention is illustrated, but not restricted, by the following examples.

Example 1

A mixture consisting of 200 ml. xylene, 200 ml. n-butanol, and 100 g. sodium carbonate was added to a reaction flask which was fitted with stirrer, dropping funnel, and reflux condenser. The latter was fitted with a water trap and all inlets were protected from moisture by calcium chloride tubes. All the reagents were carefully dried before use. The mixture was then heated to reflux, and a solution of 52 g. silicon tetrafluoride in 230 g. n-butanol was added slowly from the dropping funnel. As the SiF$_4$ was added, water distilled out of the system as an azeotrope with xylene, and collected in the water trap; carbon dioxide was also evolved. The contents of the flask were then filtered in a dry atmosphere and distilled. Crude butyl orthosilicate was collected from 116–140° C. at 3 mms. and identified by its infra-red spectrum. The solid from the flask was examined by X-ray methods and found to contain unchanged sodium carbonate, together with sodium fluoride. The reaction may therefore be represented by the equation:

$$SiF_4 + 4C_4H_9OH + 2Na_2CO_3$$
$$\rightarrow Si(OC_4H_9)_4 + 4NaF + 2CO_2 + 2H_2O$$

Example 2

A mixture of 150 g. sodium chloride, 100 ml. xylene, and 300 ml. n-butanol was added to the reaction flask of an apparatus similar to that used in the previous example. The mixture was heated to reflux, and a solution of 55 g. silicon tetrafluoride in 300 ml. n-butanol was slowly added from the dropping funnel. Within a few minutes after starting this addition, a gas was evolved from the reaction which gave a positive result when tested for chloride. Some silicon tetrafluoride was carried out of the system with the gas, but its presence did not interefere with the test for chloride ion. The SiF$_4$/butanol solution was added over a period of 3 hours, and a stream of dry nitrogen was then bubbled through the contents of the flask to strip out residual gases. The mixture was then filtered and distilled, giving 25 g. butyl orthosilicate. The solid from the filtration was shown to contain sodium fluosilicate plus unreacted sodium chloride. The reaction may be represented by the equation:

$$3SiF_4 + 4NaCl + 4C_4H_9OH$$
$$\rightarrow (C_4H_9)_4Si + 2Na_2.SiF_6 + 4HCl$$

The yield of butyl orthosilicate based on this equation was 50%.

Example 3

400 ml. dry n-butanol plus 60 g. ground calcium carbide were heated to reflux in a three-necked flask fitted with stirrer, condenser and dropping funnel. To this was added a solution of 30.5 g. silicon tetrafluoride in 200 ml. dry n-butanol, the addition taking place over 1½ hours; acetylene was evolved from the reaction during addition of the SiF$_4$. After refluxing for about 8 hours, the mixture was filtered and distilled, giving 52 g. butyl orthosilicate (B.P. 124–134°/4 mms.) plus 10 g. hexabutoxy disiloxane (B.P. 160–170°/2½ mms.). The total yield was 68%.

|  | Percent C | Percent H | Percent SiO$_2$ |
|---|---|---|---|
| Analysis of butyl orthosilicate: | | | |
| Calculated | 60.0 | 11.25 | 18.8 |
| Found | 53.7 | 11.3 | 19.2 |
| Analysis of hexabutoxydisiloxane: | | | |
| Calculated | 57.6 | 10.8 | 24.0 |
| Found | 54.3 | 9.7 | 24.0 |

*Example 4*

150 g. dried calcium oxide and 200 mls. n-butanol were stirred together at the boiling point of n-butanol in a flask fitted with condenser and dropping funnel. A solution consisting of 50 g. silicon tetrafluoride dissolved in 240 g. dry n-butanol was then added dropwise beneath the surface of the stirred mixture. The contents of the flask were then heated at reflux for 20 hours. After cooling and filtering, the liquid was distilled to remove excess n-butanol. The product remained as 25 g. of a clear liquid which was shown by analysis to be n-butyl orthosilicate.

*Example 5*

250 ml. n-butanol, 200 ml. xylene and 150 g. anhydrous calcium chloride were stirred together in a flask heated to reflux and equipped with a water take-off. The mixture was dried by azeotropic distillation until no more water was collected. To this dry mixture was added dropwise over 4 hours a solution of 52 g. silicon tetrafluoride in 300 g. n-butanol; a gas was given off which was shown to be HCl. After addition of the SiF$_4$, solution, dry nitrogen was passed through the mixture until the exit gas was free of HCl, and the mixture was cooled and filtered. The filtrate was distilled to remove excess butanol and xylene, leaving 30 g. n-butyl orthosilicate.

What I claim is:

1. Process for making organic orthosilicates comprising reacting, by heating under substantially moisture-free conditions, silicon tetrafluoride with an alcohol selected from the group consisting of aliphatic alcohols and aromatic alcohols containing the hydroxyl group in a side chain, in the presence of a metal compound selected from the group consisting of chlorides, carbonates, carbides and oxides of sodium and calcium.

2. Process as claimed in claim 1 wherein said reaction is carried out by refluxing.

3. Process as claimed in claim 1 wherein said reaction is carried out by adding a solution of the silicon tetrafluoride in said alcohol to a heated refluxing mixture of the alcohol and the metal compound, separating the resulting liquid phase from the solid phase and distilling the liquid phase to obtain said orthosilicate.

4. Process as claimed in claim 3 wherein said mixture includes an inert solvent.

References Cited in the file of this patent

FOREIGN PATENTS 955,236   Germany _____ Jan. 3, 1957

OTHER REFERENCES

Knop: Jour. Prakt. Chemie, vol. 74 (1858), pp. 41–62.
Tarbutton et al.: Jour. Am. Chem. Soc., vol. 61 (1939), pp. 2555–6.